March 2, 1926.
C. W. BARDEEN
1,575,087
APPARATUS FOR ANNEALING PIPE
Filed Jan. 15, 1925
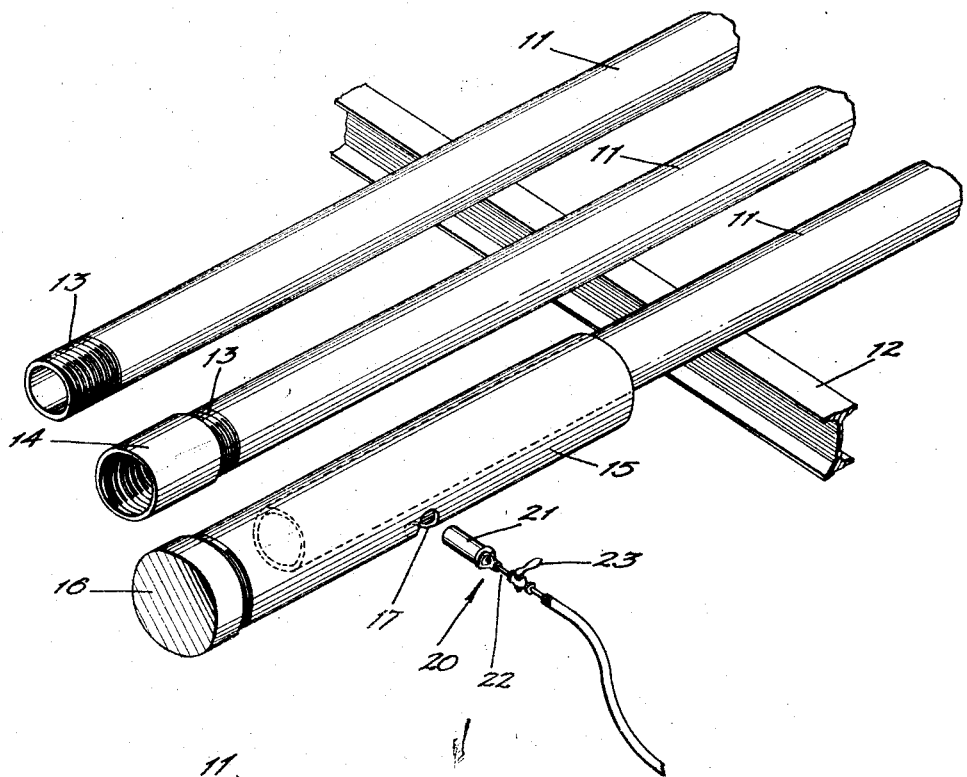
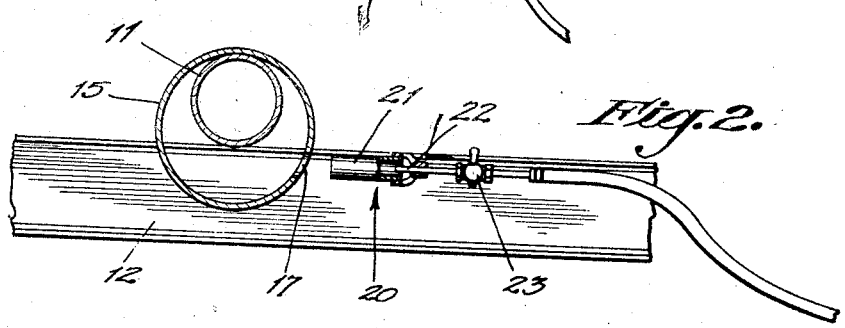
INVENTOR:
CHARLES W. BARDEEN
BY
ATTORNEY Patented Mar. 2, 1926.

1,575,087

UNITED STATES PATENT OFFICE.

CHARLES W. BARDEEN, OF LONG BEACH, CALIFORNIA, ASSIGNOR TO B AND B PIPE SHOPS, INC., OF LONG BEACH, CALIFORNIA, A CORPORATION OF CALIFORNIA.

APPARATUS FOR ANNEALING PIPE.

Application filed January 15, 1925. Serial No. 2,467.

*To all whom it may concern:*

Be it known that I, CHARLES W. BARDEEN, a citizen of the United States, residing at Long Beach, in the county of Los Angeles and State of California, have invented a new and useful Apparatus for Annealing Pipe, of which the following is a specification.

My invention has a particular utility in the oil industry in which steel and iron pipe is used, not only for conducting oil and gas, but also for drilling purposes, it being common practice to employ drill pipe, usually 6 inches in diameter, in the production of wells. This drill pipe, which carries a bit at its lower end and which is rotated by powerful engines, is subjected to considerable crystallization, particularly at the points near the ends of each joint or where the various joints and stands are connected together.

The principal object of my invention is to provide a means by which pipe, and particularly such drill pipe, can be readily annealed for the purpose of reducing the crystallization, and rendering the pipe tougher, more uniform in texture and less brittle. It is common practice to thread pipe on the outer surface at the ends, and by my process the pipe is put in condition to be more easily threaded and in such a condition that the threads are tougher and the threading operation is facilitated.

Further objects of the invention will be made evident hereinafter.

Referring to the drawing which is for illustrative purposes only,

Fig. 1 is a perspective view showing the method of practicing my invention.

Fig. 2 is a section through the pipe and muffle employed.

It is common practice in oil well drilling to pile the casing, tubing or drill pipe 11 on suitable racks 12, over which the pipe can be readily rolled, these racks being commonly elevated somewhat from the ground by suitable supports (not shown). The ends of the pipes are commonly threaded, as shown at 13, and may have collars 14 thereon. During the drilling operation there is a tendency for the pipe to crystallize, and this tendency seems to be somewhat greater in those portions of the pipe which are close to the collar.

As the joints of the pipe are ordinarily 20 feet or more in length, and weigh several hundred pounds, it requires a large furnace to anneal the entire pipe, and the labor of inserting the pipe in the hot furnace and withdrawing it therefrom in its heated condition is considerable. My invention provides a ready means for annealing the pipe without taking it from the rack, and the heat is so applied that the pipe when annealed is in excellent condition.

In the practice of my invention I utilize a short length of pipe, which for convenience I call a muffle, the outer end of this pipe being closed by a cap or by any other convenient means. Near the center of the muffle 15 I provide an opening 17. The muffle 15 is larger in diameter than the pipe 11, being in fact a piece of casing of somewhat larger diameter. For example, in annealing 6 inch drill pipe it is convenient to use 10 inch casing for the muffle.

Before annealing, the collars 14 are ordinarily removed from the pipe 11 and the muffle 15 is slipped over the pipe in the manner shown in the drawings, the muffle 15 resting upon and being entirely supported by the pipe 11. A gas burner 20 is then placed in such a position that the heated gases therefrom can be projected through the opening 17. The burner 20 is of the ordinary Bunsen type, consisting of an enlarged tube 21 open at either end. A gas pipe 22 which is preferably provided with a valve 23 projects into one end and the gas issuing therefrom under pressure is mixed with air in the tube 21, the mixture being ignited and projected through the opening 17 into the space inside the muffle. The hot gases from the burner move at a considerable velocity, and the interior of the muffle is raised to a sufficient temperature to rapidly heat the pipe to an annealing temperature.

By the arrangement shown the outer end of the pipe is so heated that the temperature is highest near the end, being gradually decreased towards the center of the pipe so that there is no sudden change in condition between the annealed portion and the remainder of the pipe. This produces a superior annealing, since it does away with any liability of breakage at the point of transition. It will be noted that my invention has a special utility when used in this connection, since a muffle can be readily placed over the end of the pipe, the pipe can be annealed, and the muffle can then be immediately withdrawn and replaced on the next joint. If desired, two muffles can be employed, one on each end of the pipe to be annealed.

I claim as my invention:

1. An apparatus for annealing the ends of pipe comprising: a muffle having a closed outer end and an open inner end and adapted to be placed over a projecting end of the pipe; and means for projecting hot gases into the space between the pipe and the muffle in a manner to permit said gases to escape from said open inner end of said muffle.

2. An apparatus for annealing the ends of pipe comprising: a muffle having a closed outer end and an open inner end and adapted to be placed over a projecting end of the pipe, said muffle resting upon and being entirely supported by said pipe; and means for projecting hot gases into the space between the pipe and the muffle in a manner to permit said gases to escape from said open inner end of said muffle.

3. An apparatus for annealing the ends of pipe comprising: a cylindrical muffle having a closed outer end and an open inner end and adapted to be placed over a projecting end of the pipe; and means for projecting hot gases into the space between the pipe and the muffle in a manner to permit said gases to escape from said open inner end of said muffle.

4. An apparatus for annealing the ends of pipe comprising: a cylindrical muffle having a closed outer end and an open inner end and adapted to be placed over a projecting end of the pipe, said muffle resting upon and being entirely supported by said pipe; and means for projecting hot gases into the space between the pipe and the muffle in a manner to permit said gases to escape from said open inner end of said muffle.

5. An apparatus for annealing the ends of pipe comprising: a muffle having a closed outer end and an open inner end and adapted to be placed over a projecting end of the pipe; and a burner so placed as to project hot gases through an opening in the side of said muffle into the space around said pipe inside said muffle in a manner to permit said gases to escape from said open inner end of said muffle.

In testimony whereof, I have hereunto set my hand at Long Beach, California, this 7th day of January, 1925.

CHARLES W. BARDEEN.